United States Patent [19]

Fischbach

[11] Patent Number: 4,782,555
[45] Date of Patent: Nov. 8, 1988

[54] UTENSIL HANDLE FOR FASTENING ON BOLTS

[75] Inventor: Wolfgang Fischbach, Daaden, Fed. Rep. of Germany

[73] Assignee: Heinrich Baumgarten KG, Spezialfabrik fuer Beschlagteile, Neunkirchen, Fed. Rep. of Germany

[21] Appl. No.: 77,035

[22] Filed: Jul. 22, 1987

Related U.S. Application Data

[63] Continuation of Ser. No. 875,853, Jun. 18, 1986, abandoned.

[30] Foreign Application Priority Data

Jun. 18, 1985 [DE] Fed. Rep. of Germany ... 8517666[U]
Dec. 23, 1985 [EP] European Pat. Off. ........ 85116527.4

[51] Int. Cl.$^4$ .......................... A47J 45/10; B25G 3/24
[52] U.S. Cl. ................. 16/110 A; 16/114 A; 16/DIG. 24
[58] Field of Search ........ 16/110 A, 114 A, DIG. 24, 16/DIG. 40; 403/357; 15/145; 292/352, 353

[56] References Cited

U.S. PATENT DOCUMENTS

| 1,800,055 | 4/1931 | De Tar | 403/357 |
| 1,909,665 | 5/1933 | Douglas | 16/DIG. 24 |
| 2,133,253 | 10/1938 | Moore | 16/114 A |
| 2,158,728 | 5/1939 | Peters | 16/DIG. 24 |
| 2,252,855 | 8/1941 | Lasch | 292/353 |
| 3,329,452 | 7/1967 | Ammon | 292/353 |
| 3,878,584 | 4/1975 | Witte | 16/110 A |
| 3,883,169 | 5/1975 | Fischbach | 16/114 A |
| 4,179,146 | 12/1979 | Fischback | 16/114 A |

FOREIGN PATENT DOCUMENTS

| 2340723 | 2/1975 | Fed. Rep. of Germany ... 16/110 A |
| 403979 | 12/1933 | United Kingdom ................ 282/348 |
| 869907 | 6/1961 | United Kingdom ................ 292/353 |
| 1442676 | 7/1976 | United Kingdom ............ 16/110 A |

Primary Examiner—Fred A. Silverberg
Attorney, Agent, or Firm—Flynn, Thiel, Boutell & Tanis

[57] ABSTRACT

A utensil handle including a handle member of plastic having a front opening recess for receiving a bolt adapted to be secured on the utensil, whereby the cross section of the recess in the handle member and the one of the bolt conform to one another and both have a polygonal cross section and the bolt is provided with a notch which has a sloped surface and the bolt and the handle member are held together frictionally with a spring which is held on said handle member and acts onto the sloped surface of the bolt. In order that the utensil handle can be manufactured inexpensively and can be mounted easily, a simply formed spring is provided which acts onto the bolt through large lever arms, brings about a relatively large tolerance balance, permits an all around guide for the bolt in the handle and permits the mounting of the handle to the utensil. The spring has a back which extends in insertion direction in the recess. The spring is pivotally supported about its bearing points on the handle member. The spring has in insertion direction support points for the bolt which are spaced from one another. A tensioning of the spring occurs only when both support points rest on the bolt. The spring is thereby guided perpendicularly with respect to the insertion direction of the bolt.

10 Claims, 1 Drawing Sheet

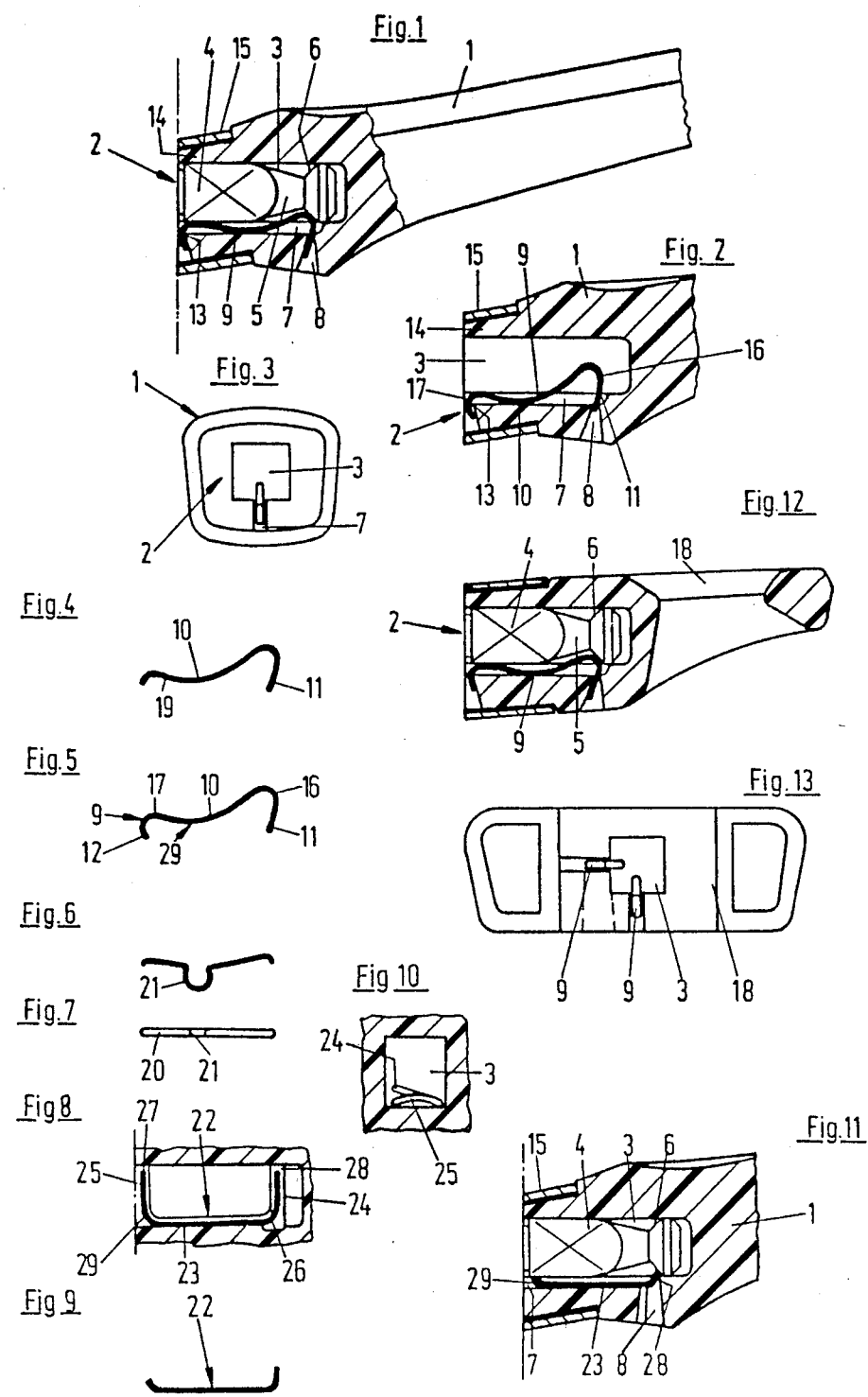

ically to one another. The spring is in this case stressed torsion during insertion of the bolt, whereby the spring has then two swivel points which are diagonally opposite one another. Here too a tensioning of the spring is obtained only when the bolt slides over the second support point of the spring, which second support point lies in the back. The support points of the spring are advantageously spaced from one another at a distance which corresponds with the length of the spring, so that here a lever arm which is as large as possible is obtained.
UTENSIL HANDLE FOR FASTENING ON BOLTS This application is a continuation of U.S. Ser. No. 875,853, filed June 18, 1986, now abandoned.

FIELD OF THE INVENTION

The invention relates to a utensil handle comprising a handle member of plastic having a front opening recess for receiving a bolt adapted to be secured on the utensil, whereby the cross section of the recess in the handle member and the one of the bolt conform to one another, both have a polygonal cross section, the bolt being provided with a notch having a sloped surface. The bolt and the handle member are held together frictionally by a spring which is held in the handle member and acts onto the sloped surface of the bolt.

BACKGROUND OF THE INVENTION

A utensil handle of the abovementioned type is known from German Patent No. 2 340 723. This utensil handle has the advantage that it can absorb large reaction forces without damage to the handle member. However, a disadvantage exists in this utensil handle in that the bar-shaped spring, the two legs of which are fixed in the handle member, can compensate only for small tolerances created during the manufacture of the utensil itself, that is, tolerances which exist, for example, due to a welding of the bolt on the utensil wall.

The basic purpose of the invention is, to provide a utensil handle of the above type so that the same can be manufactured inexpensively and can be mounted comparatively simple, that a simply shaped spring can be used which acts through large lever arms onto the bolt and brings about a relatively large tolerance compensation, permits an all around guiding of the bolt in the handle and permits a removal of the handle from the utensil.

In an inventive utensil handle, the spring back is arranged in an insertion direction of the bolt, whereby the spring engages the bolt at two support points spaced relatively far from one another, so that through this the bolt is pressed against the oppositely lying wall of the recess and in this manner with relatively small spring forces a canting of the bolt is with certainty impossible. The spring as such is rotatable, however, is held in longitudinal direction nonmovably in the recess of the handle member. This has the advantage that during introduction of the bolt into the handle, the support point of the spring lying near the opening of the handle recess is swung downwardly without causing the spring to become tensioned. The tension of the spring occurs only when the second support point of the spring rests on the bolt. This measure has the advantage that a major portion of the length of the bolt can be inserted into the recess of the utensil handle, which recess guides said bolt on all sides, before the spring opposes a further insertion with an increased resistance. This makes a canting impossible, which could occur during an immediate tensioning of the spring during insertion of the bolt.

It is impossible to use as a spring either a concavely curved spring, which consists advantageously of a round spring wire and which with its spring back engages a longitudinally extending slot in the recess, so that same is held laterally. The spring can then be rotated freely about its support on the spring back. For fixing the spring in longitudinal direction, it is possible to form a nose which is received in a bore in the recess either on the spring back or, however, the rear end of the spring can be bent outwardly so that same is received in a bore which is arranged in the recess. The spring end must be sufficiently long that same is received in the bore even yet when the front end is swung completely toward the bottom of the recess.

According to a further suggestion of the invention, the spring can also consist of a U-shaped bent spring wire, whereby the two spring legs project approximately at a right angle in the same direction from the spring back and are twisted relative to one another. The spring is in this case stressed torsion during insertion of the bolt, whereby the spring has then two swivel points which are diagonally opposite one another. Here too a tensioning of the spring is obtained only when the bolt slides over the second support point of the spring, which second support point lies in the back. The support points of the spring are advantageously spaced from one another at a distance which corresponds with the length of the spring, so that here a lever arm which is as large as possible is obtained.

For a premounting of the spring in the utensil handle for transport to the applicator, the spring is advantageously clamped in the recess of the utensil handle which, in the simplest case, is obtained by the use of a concave spring having a front, outwardly bent end which grips behind a shoulder of the handle member. The shoulder must be constructed so that a free downward swing of the spring is assured, however, a complete lifting of the spring out of the guide groove is prevented. A further measure for facilitating removal consists in the guide groove for the spring back being made narrow so that the spring back is held in the guide groove under a light clamping tension.

BRIEF DESCRIPTION OF THE DRAWINGS

Several exemplary embodiments of the invention will be described in greater detail hereinbelow with reference to the drawing, in which:

FIG. 1 is a partial cross-sectional side view of a stem handle according to the invention;

FIG. 2 illustrates the same stem handle as in FIG. 1, however, with a premounted and nonstressed spring;

FIG. 3 is a front view of the handle according to FIG. 2;

FIG. 4 to 7 illustrate three embodiments of concavely constructed springs;

FIGS. 8 and 9 are a top view and a side view of a further embodiment of a U-shaped designed spring;

FIG. 10 is a front view of a spring according to FIG. 8 and 9, which spring is inserted into a recess of a handle and is not yet loaded by the bolt;

FIG. 11 is a cross-sectional view of a stem handle with a spring according to FIGS. 8 and 9 in mounted condition;

FIG. 12 illustrates a side handle according to the invention; and

FIG. 13 is a front view of a side handle according to the invention with two springs arranged in two planes lying perpendicularly to one another.

DETAILED DESCRIPTION

The utensil handle 1 which is illustrated in FIGS. 1 to 3 consists of a plastic and has on its front side 2 a recess 3 having a square cross section.

An elongated bolt 4 is adapted to be weldably secured to a wall of a not illustrated utensil and is received on the recess 3, the length of which bolt is slightly shorter than the length or depth of the recess 3 and which has a cross section which conforms with the recess 3 so as to be guided by the walls of the recess. The bolt 4 is constructed square throughout and has a notch or zone of reduced thickness 5 in its front area, which zone includes a sloped surface 6 facing toward the end of the bolt which is to be secured to the utensil.

A groove 7 is constructed in the lower area of the recess 3. A transversely extending bore 8 extends into the groove 7. A spring 9 is inserted into the groove 7, which spring is illustrated in FIG. 5. The guide surface for the bolt is only slightly limited through this, so that the holding and turning forces are received on a large surface. The spring 9 has a concavely constructed spring back 10 and has two outwardly angularly bent ends 11, 12. The end 11 is constructed longer than the end 12 and is received in the bore 8. The end 11 is constructed sufficiently long that the same still is housed within the bore 8 when the front end 12 of the spring is pressed by the bolt 4 completely downwardly. The spring is supported on its spring back 10 on the base of the groove 7.

The end 12 is also angularly outwardly bent and grips behind a shoulder 13 provided in the groove 7. The end 12 is bent sufficiently inwardly that a falling of a premounted spring 9 out of the groove 7 and thus out of the recess 3 of the utensil handle 1 is prevented. In other words, the ends 11 and 12 form a spring clip which grips the bearing points defined by the shoulder 13 and bore 8.

A sleeve 15 is mounted on and encircles the front end 14 of the utensil 1 and extends to the front side 2 of the utensil handle 1. Through this it is assured that the utensil handle is not only supported by the sleeve 15 on the wall of the pot, but also by the front facing surface of the plastic handle so that the bolt 4 is supported directly adjacent its fastening point to the utensil wall. This has the advantage that, in the case of a soft utensil wall, which can for example consist of aluminum, a deformation of the wall, when a load is applied to the handle, is substantially avoided.

The bolt 4 is secured to the utensil wall. During an insertion of the bolt 4 into the recess 3, the same slides first over the spring 9 which is rockably arranged in the recess 3 about its support point in the groove 7 without the spring being tensioned. Through this it is achieved that the bolt is able to move almost up to 2/3 of the length of the recess 3 into the recess already before a deformation of the spring 9 occurs, which requires an increased insertion force. At this point in time, however, the bolt is already guided so well in the recess 3 that a canting of the bolt during the further insertion thereof is not possible. The bolt 9 slides then onto the support point 16 of the spring 9, whereby the support point 16 is swung or pivoted downwardly about its fulcrum point on the spring back 10 and the support point 17 at the opposite end now engaging the bolt. The spring 9 forms then with its two support points 16, 17 a balance which presses the bolt 4 uniformly against the oppositely lying surface of the recess and the support point 17 engaging the sloped surface 6 urges the front facing end of the handle 1 into tight engagement with the utensil wall. Due to the large distance between the support points 16, 17, a large moment is already obtained with a relatively small spring, so that a tilt-free holding of the bolt in the utensil handle 1 is achieved.

The handle which is illustrated in FIG. 12 is a side handle 18 which is selectively secured on the utensil wall by one or two bolts 4 weldably secured to the utensil wall. Here the same spring 9 described above is used for fastening the utensil handle 18 to the bolts 4.

In a modification of the side-handle fastening according to FIG. 12, the side handle 18 according to FIG. 13 is, however, secured only with one bolt, however, with springs 9 which lie in planes offset at 90° to one another. It is achieved through this that the bolt is pressed into one corner of the recess 3 which, aside from the contact force, which is increased by the use of two springs, brings about simultaneously an increased security against rotation and tolerance compensation.

The spring 19 according to FIG. 4 is also a concavely curved spring with a spring back 10, in which only one bent end 11 is provided and which is received into the bore 8 in the utensil handle 1. By using a spring 19, a secure fit of the spring in the groove 7 must be achieved by keeping the groove slightly more narrow and thus clamping the spring back easier into the groove.

In the exemplary embodiment of a spring 20 according to FIGS. 6 and 7, the two ends are only rounded in order to make a sliding of the bolt and a resting of the support point 16 on the sloped surface 6 of the bolt easier. Here, for fixing of the spring 20 in the longitudinal direction of the recess 3 on the spring back, there is formed a nose or U-shaped bend 21 which is received in a bore which is then centrally arranged in the groove 7 and is not illustrated. Otherwise, the function of the spring is the same as has been described above with reference to a spring according to FIG. 5.

The spring 22 according to FIGS. 8 and 9 is constructed U-shaped and has a spring back 23, on which are formed approximately perpendicularly thereto two spring legs 24, 25. As is shown in FIGS. 9 and 10, the spring back 23 is twisted so that the spring leg 24 extends in a different direction from the spring back 23 than the spring leg 25. That is, the end of the leg 24 points, upwardly in the plane of the drawing for FIG. 9. A front view of the spring 22 is shown in FIG. 10. FIG. 10 shows the spring leg 25 curved, which has the additional advantage that an additional spring action is obtained from the spring leg 25.

FIG. 11 shows a utensil handle 1 constructed in the form of a stem handle and in a condition mounted on the bolt 4. The spring back 23 lies again in a groove 7 which, in this embodiment is U-shaped, whereby the mounting securement is achieved by the spring back being clamped lightly into the corresponding portion of the groove 7. During insertion of the bolt 4, the leg 25 is first pressed into the corresponding portion of the groove 7, which in this exemplary embodiment extends parallel to the front surface of the handle so that here too the bolt 4 can be moved up to ⅔ into the recess 3 without causing a tensioning of the spring 22. Only after the front end of the bolt 4 hits the rising leg 24, same is bent downwardly into the corresponding portion of the groove by the bolt, whereby a pivoting of the spring 22 about the two bearing points 26, 27 occurs, as they are illustrated in FIG. 8. The spring 22 rests then with its two support points 28, 29 on the bolt 4, whereby the support point 28 will rest on the sloped surface 6 and presses the utensil handle 1 against the utensil wall.

If the leg 25 is curved, as this is illustrated in FIG. 10, then an additional pressure is applied onto the bolt 4 by the spring leg 25.

For effecting a removal of a side handle or a stem handle, it is only necessary to pull the handle off from the utensil with increased force. It is also possible to use a screwdriver which can be inserted between the front side 2 of the handle 1 or 18 and the utensil wall. The support point 27 or 16 slides then up the sloped surface 6 on the bolt 4. After the support point 27 or 16 passes the sloped surface 6, the spring force relaxes and the handle can be easily pulled off again from the bolt 4.

The spring 9, 22 is advantageously constructed slightly curved in a direction perpendicular to its longitudinal extent, namely, in a direction into and out of the plane of the drawing for FIGS. 5 and 9, so that same is held under tension in the groove which received it. This prevents a falling out of the premounted spring during transport.

The embodiments of the invention in which an exclusive property or privilege is claimed are defined as follows:

1. In a utensil handle consisting of a handle member of plastic having a front opening recess for the receiving of a bolt which is adapted to be secured to a utensil wall, a cross section of said recess in said handle member and a cross section of the bolt being conformed with one another and both have a polygonal cross section, said bolt being provided with a notch having a sloped surface so that said bolt and said handle member are held together frictionally with a spring which is held in said handle member and acts onto said sloped surface of said bolt, the improvement comprising wherein a back of said spring lies approximately in an insertion direction of said handle member in said recess, wherein said spring is pivotally supported about at least one bearing point on said handle member, wherein said spring has in said insertion direction two support points for said bolt, said support points lie spaced from one another, wherein means are provided for effecting a tensioning of said spring only when both said support points rest on said bolt when said bolt is inserted a majority of the way into said recess, said handle becoming attached and said spring being tensioned when the bolt is moved the remainder of the way into said recess to a fully inserted position, said spring remaining untensioned at all other times during an insertion of said bolt into said recess in said handle, and wherein said support points of said spring are guided for movement perpendicularly with respect to said insertion direction of said bolt to facilitate a keeping of said spring from becoming tensioned until said support points both engage said bolt.

2. A utensil handle according to claim 1, wherein said back of said spring is constructed concavely and said back of said spring is received in a groove in said recess which groove extends in said insertion direction.

3. A utensil handle according to claim 1, wherein one end of said spring is bent angularly outwardly and is guided freely movably in a bore in said recess.

4. A utensil handle according to claim 3, wherein the other end of said spring is bent also downwardly angularly and engages behind said at least one bearing point on said handle member.

5. A utensil handle according to claim 1, wherein said back of said spring is constructed concavely and wherein a U-shaped bend is formed on an outer side of said spring back.

6. A utensil handle according to claim 1, wherein said spring is constructed U-shaped with a spring back and two spring legs, wherein the spring legs lie approximately perpendicularly to the insertion direction and the spring back is twisted so that the two spring legs extend in different directions from the spring back.

7. A utensil handle according to claim 6, wherein one of said spring legs is curved in itself.

8. A utensil handle according to claim 1, wherein for the fastening of said handle member to said bolt, several of said springs are used which lie in various planes.

9. A utensil handle according to claim 1, wherein said utensil handle ends flush with a sleeve which is secured on said utensil handle.

10. A utensil handle according to claim 1, wherein said spring for transport security is constructed curved perpendicularly with respect to its longitudinal extent such that said spring is held under tension in a groove in said recess.

* * * * *